Figure 1:
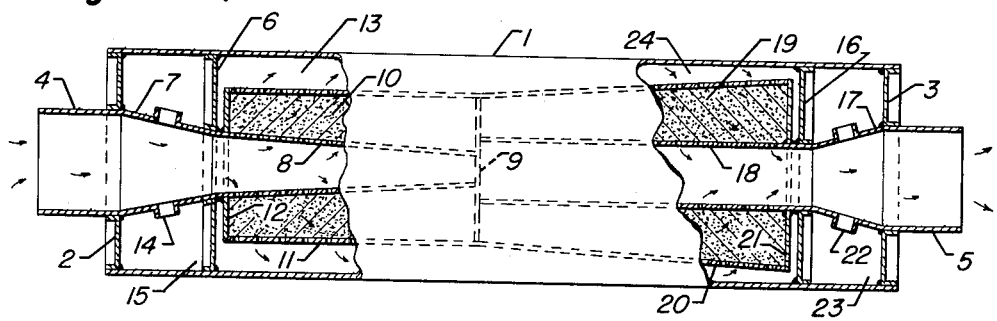

April 27, 1965  R. J. J. HAMBLIN  3,180,712

TWO-STAGE CONVERTER-MUFFLER

Filed Dec. 26, 1962

Heat Transfer Fins

Auxilliary Air Inlet

INVENTOR:
Robert J. J. Hamblin

BY: *James R. Hoatson Jr.*
*Philip T. Liggett*
ATTORNEYS

United States Patent Office 3,180,712
Patented Apr. 27, 1965

3,180,712
TWO-STAGE CONVERTER-MUFFLER
Robert J. J. Hamblin, Chicago, Ill., assignor to Universal Oil Products Company, Des Plaines, Ill., a corporation of Delaware
Filed Dec. 26, 1962, Ser. No. 247,038
3 Claims. (Cl. 23—288)

The present invention relates to an improved form of two-stage converter-muffler, and more particularly, to a catalytic converter for the treatment of engine exhaust gases wherein there are maintained two separate catalyst beds for serially contacting the gas stream.

The desirability of removing or converting the noxious compounds of vehicular exhaust gases has been generally well established as a means for overcoming smog in many geographical areas. In a catalytic operation, the hot gases issuing from the motor exhaust manifold are mixed with a quantity of secondary or combustion air and the resulting mixture passed through a catalyst bed maintained within a conversion zone so as to effect a more or less complete oxidation of carbon monoxide and unburned hydrocarbons present in the exhaust stream. The use of a catalytic method and apparatus also provides for the initiation of the oxidation reaction at lower temperatures than might otherwise be possible and effectively eliminates the need for igniting means which are generally used with most types of "afterburners" or other apparatus which depend strictly upon thermal conditions.

A preferred form of exhaust gas conversion apparatus embodies a design and construction which provides for the internal placement or positioning of a catalyst bed such that it may be utilized in an efficient manner and to maximum degree. It is not intended to limit the present invention to the use of any one type of catalyst since there are improved catalyst compositions available which will retain their catalytic efficiency for long periods of operation. The catalyst is used in particle form, such as small spheres, cylinders and/or pellets, and is disposed in a suitable catalyst retaining section providing for uniform flow therethrough.

One of the problems encountered in the use of catalytic converters for the oxidation of exhaust gases is that, under certain vehicle operating conditions where the gas stream is rich in carbon monoxide and hydrocarbons, the catalyst bed temperatures may be excessively high for many forms of standard oxidation catalysts, and unless means is provided to effect an intermediate cooling of the gas stream within the unit, or alternatively, there is provided means to bypass at least a portion of the exhaust gas stream from contact with the oxidation catalyst there may be rapid deactivation of a catalyst.

It is thus a principal object of the present invention to provide a converter design which in an intermediate stage, channels the gas flow in an annular stream adjacent the outer housing such that the gas stream may be cooled by heat transfer to the outer housing wall.

It is also an object of the invention to provide a construction and arrangement which utilizes two separate catalyst beds and a flow path within the unit, such that after an initial high space velocity contact in one bed, the gases pass in an elongated annular flow stream in a cooling heat exchange relationship with the outer shell or housing prior to their flow through a second stage of catalyst.

Inasmuch as the catalytic oxidation reaction is exothermic, it is desirable that the contact in the first catalyst bed or first stage shall be run at a relatively high space velocity and mass velocity so that only partial combustion is carried out in such bed. It is also desirable that the oxidation shall take place along the downstream surface or periphery of the catalyst bed such that there will be a minimization of preheating effects to the exhaust gas stream passing through the bed and sufficient heat dissipation to the outer shell of the unit both by the exhaust gas stream passing in contact therewith and by radiation from the first bed so that none of the catalyst in either bed is heated to a temperature high enough to cause rapid deactivation. Thus, the gas mixture entering the second stage of catalyst contact is at a reduced temperature and contains a lower concentration of combustibles. Sufficient catalyst is maintained in the second stage of the unit to insure substantial completion of the combustion of the oxidizable components in the exhaust gas stream prior to their discharge from the unit.

A secondary advantage to this two-stage converter-muffler apparatus resides in the fact that two different catalysts may readily be used in the two beds of the unit. In other words, a relatively small quantity of a fairly active oxidation catalyst may be provided within the first stage of contact such that there is initiation of the oxidation reaction together with partial oxidation of the total gas flow. While in the second bed, there may be a larger quantity of less active catalytic material maintained to complete the oxidation of the reaction. The increased temperature within the gas stream leaving the first stage of contact will insure ready ignition within the less active catalyst bed. At high temperature levels in the second stage bed, there may be a substantially complete thermal oxidation of the exhaust gas stream by reason of the preheating of the gas from the first contact bed and by heat retention in such bed; however, the contact material in the high temperature bed shall be heat resistant and be highly stable.

In one embodiment, the two-stage catalytic converter apparatus for treating an exhaust gas stream comprises in combination an elongated cylindrical-form outer housing with end closure members having gas port means therethrough, an outer perforate elongated cylindrical-form catalyst retaining shell means spaced from the inside wall of said housing for substantially the full length thereof and forming therewith an elongated annular space providing in sequence a gas collecting section and a gas distributing manifold section, an upstream inner perforate cylindrical-form catalyst retaining member within and spaced from said outer perforate shell means at one end thereof, a downstream inner perforate cylindrical-form catalyst retaining member within and spaced from said outer perforate shell means at the other end thereof, partitioning plate means extending transversely across the inside of said outer perforate shell means and between the adjacent interior end portions of said inner perforate catalyst retaining members, whereby to form an upstream catalyst retaining section and a separate downstream catalyst retaining section, such sections being co-extensive with respectively said upstream inner catalyst retaining member and with said downstream inner catalyst retaining member, and inlet gas passageway means connecting between the interior of said upstream perforate catalyst retaining section and the adjacent gas port means in an end closure of said housing and outlet gas passageway means connecting between the interior of said downstream perforate catalyst retaining member and the adjacent port means in the other end closure of said housing, whereby the gas stream through said apparatus passes initially radially outwardly to the gas collecting section, longitudinally to the gas distributing manifold section adjacent the outer housing, then radially inwardly to the interior of said downstream inner catalyst retaining member and thence outwardly through the gas port means connecting therewith.

In a modified embodiment the unit may be provided with fin construction internally and externally of the outer shell or housing such that the inner fins are available to absorb heat from the gas stream in the outer annular form gas passageway while outer fins increase heat dissipation from the unit. In other words, extended surface area fin means are used to assist in the lowering of temperature of the gas stream ahead of the downstream catalyst bed.

It may be pointed out that radial flow through an annular form of bed of catalyst or other subdivided contact catalyst is of particular advantage in fluid-solids contacting in that it provides a substantially uniform flow through a relatively large surface area. However, where a relatively high velocity gaseous stream is introduced into a converter and diverted radially through a straight cylindrical or oval shaped annular-form catalyst bed, there tends to be a non-uniform flow along the axis of such bed. Particular with a high mass flow rate through a uniform depth of annular bed, there is a tendency for a major portion of the gas stream to bypass the upstream end portion of the bed and to flow radially through the downstream end portion. Actually, as portions of the total gas flow pass through the bed, the velocity of the remaining gas flow within the inlet manifold is reduced to result in a decreased velocity head and an increased static head from the upstream to the downstream end of the inlet zone. This differential static head gradient causes an increased flow through the bed, when moving from the upstream to the downstream end of the unit, and this inequality of flow becomes progressively worse as the total flow rate increases.

A preferred form of the present apparatus provides a design and construction having the catalyst bed in the shape of a tapering annulus in order to provide a greater particle bed depth in the downstream end of the unit, such that there will be a greater pressure drop through the downstream portion of the bed which will tend to balance the higher static head at such portion. The result is a decreased flow rate through the bed at the downstream end and a more uniform flow through the entire annular-form catalyst bed. For low flow rates and for a low mass velocity, there will be a greater quantity of the total radial flow through the thinner upstream end portion of the tapering catalyst section. Actually, it is not practical to use means to obtain a uniform space velocity throughout an entire elongated catalyst bed for all flow rates of an exhaust gas stream from an auto engine; however, a preferred design, embodying a variable thickness to an elongated annular-form of catalyst bed, does provide the advantage of permitting a greater bed thickness for the greater quantity of radial flow at a downstream end portion of the bed for high flow rates to the unit, while permitting gas flow through a thinner section for low flow rates to the unit.

Still another advantage of the two-stage converter unit resides in the greater flexibility of operation by virtue of valving arrangements which may be integrated internally to bypass one or both of the contact beds. In other words, in an elongated converter using two annular-form catalyst beds in an end to end position, there may be valving means positioned in a partitioning plate between the adjacent ends of the beds such that in effect both beds of catalyst are bypassed by virtue of the exhaust gas stream passing substantially in a straight line path through the entire unit. Alternatively, valving means may be provided ahead of the upstream catalyst bed such that all or at least a portion of the exhaust gas stream passes around such first bed of catalyst but is distributed by the downstream manifold section to pass through the second stage catalyst bed before being exhausted from the unit.

It is to be understood that the terminology "cylindrical," "cylindrical-form," "annular-shaped" or "annular-form," as used herein, embodies both circular and oval cross sections with respect to a tubular member or a zone between spaced tubular members, inasmuch as the present improved form of construction may apply to either the circular or oval form of housing and interior chambers. The exterior appearance of the improved converter-muffler will thus be similar to that of the present day cylindrical or oval-shaped mufflers and resonators in use with automobiles and trucks. Oval shapes are preferred for present day passenger automobiles in order to reduce the height of the converter and more readily permit installation on the vehicle without unduly interfering with necessary road clearances. On the other hand, the improved two-stage arrangement of the present invention, with gas flow passing in heat exchange relationship with the outer housing, may also be used for rectangularly shaped contact beds. For example, the exhaust gas flow may pass outwardly through upstream top and bottom flat beds and then along the outer housing prior to passing inwardly through downstream contact sections and then out of the unit.

The design and construction of the present improved two-stage converter-muffler, as well as other advantages in connection therewith, may be better set forth and explained by reference to the accompanying diagrammatic drawings and the following description thereof.

FIGURE 1 of the drawing indicates in a sectional elevational view one embodiment of an oval shaped converter-muffler having two separate catalyst retaining sections maintained in an end to end arrangement.

Figure 2:
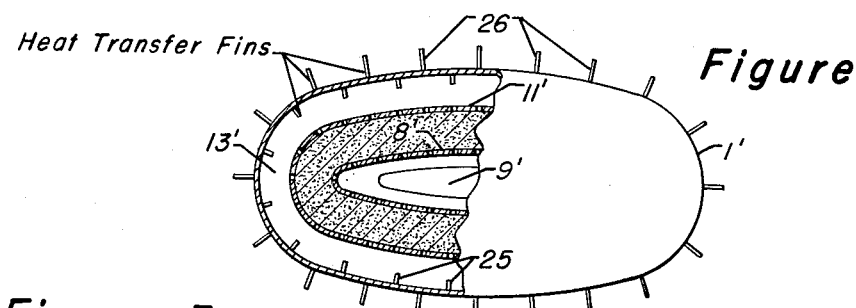

FIGURE 2 of the drawing is a partial sectional view through an oval form of the converter, similar to that of FIGURE 1 but with heat transfer fins indicated diagrammatically in combination with the outer shell of the unit.

Figure 3:
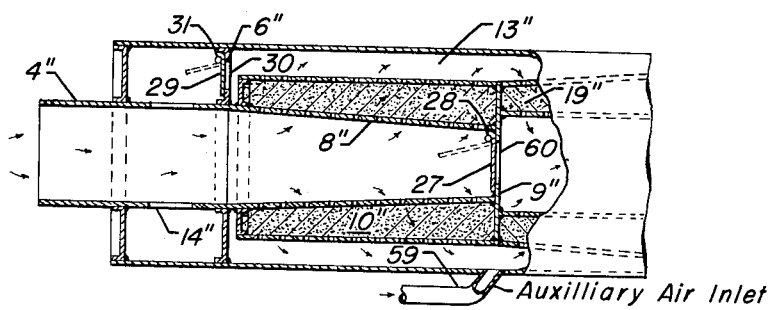

FIGURE 3 of the drawing is a partial sectional elevational view through a modified form of converter-muffler indicating valving means in combination with the partitioning means to provide alternate flow path for the exhaust gas stream in the unit.

Figure 4:
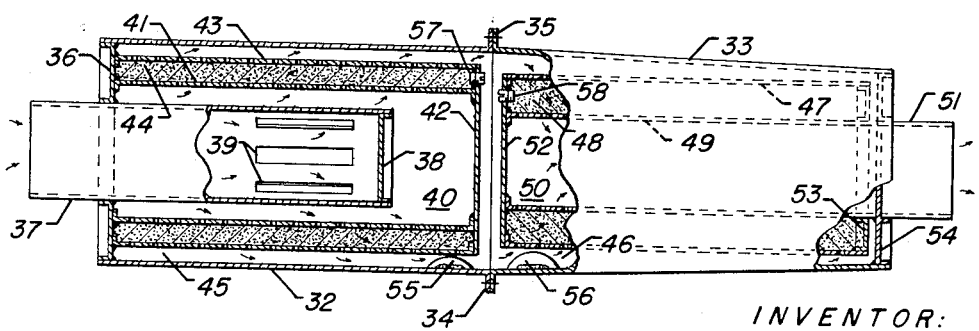

FIGURE 4 of the drawing is a sectional elevational view through still another modified form of elongated converter-muffler utilizing two separate catalyst beds for treating an exhaust gas stream, with such modification indicating a different form of gas distributing inlet and a two-part outer housing permitting ready access to the internally positioned catalyst retaining sections.

Referring now to FIGURE 1 of the drawing there is indicated an oval shaped outer housing 1 having end plates 2 and 3 which in turn have short pipe sections providing exhaust gas ports 4 and 5 to accommodate an exhaust gas flow. The present embodiment indicates port 4 as being used as a gas inlet to the unit, while port 5 provides an exhaust gas outlet from the unit; however, it may be pointed out that a catalytic converter unit of this general design and arrangement may accommodate the exhaust gas flow in the reverse direction. At one end of the unit there is an interior transverse partition 6 with a central opening adapted to circumscribe and connect with a tapering circular-to-oval transition member 7 which in turn connects port 4 with an inner tapering perforate member 8. The latter connects at its downstream end with a non-perforate transverse divider plate 9 such that the exhaust gas stream entering the interior of the tapering tubular member 8 is necessarily diverted radially through its perforations into a catalyst section 10 and through an outer perforate catalyst retaining member 11.

Perforate member 11 is of an oval shape connecting at one end with a radially extending transverse end member 12 which is spaced a short distance from transverse partitioning plate 6. At the other end, the member 11 connects with the external periphery of the non-perforate partitioning plate 9. The outer perforate catalyst retaining member 11 is also spaced inwardly from the outer shell or housing 1 such that there is provided an annular gas collection section 13. In a modified design, the end plate 12 may be eliminated, so that perforate member 11 connects directly to the transverse partitioning member 6; however, the construction and arrangement indicated is preferred in that it permits differential expansion between the inner high temperature perforate member 11 and the cooler outer shell 1, with radial end plate 12 being permitted to deflect from the fixed connection on the tapering inner perforate member 8. The tapering transition section 7 is provided with one or more openings 14 such that the exhaust gas stream is in open communication with the trapped zone 15 to provide a resonator section and improve the muffling characteristics of the unit. Also, it may be noted that the tapering inner member 8, with respect to outer perforate member 11, provides a greater cross-sectional area or depth to the catalyst section 10 at its downstream end to in turn assist in effecting a uniform space velocity through such section.

In a similar opposite hand type of construction, there is provided at the downstream end of the converter unit a transverse partitioning member 16 spaced inwardly from the end plate 3 and a transition member 17 which is a short tubular oval to round section providing for the transfer of exhaust gasses to the outlet port 5 from an inner perforate tubular member 18. The latter extends from transverse plate 16 to the interior transverse non-perforate divider plate 9 and provides an internal gas collecting section, as well as internal retaining wall for catalyst in an annular form catalyst section 19 extending circumferentially around member 18. An oval form external perforate catalyst retaining member 20 extends from the periphery of divider plate 9, or as a continuation of the end of perforate member 11, to the external periphery of a radial end plate 21. The latter is spaced a short distance from transverse plate 16 and has its inner periphery welded or sealed to the end of perforate tubular member 18 to provide a flexible end member for a catalyst section 19.

Also, in a manner similar to the inlet end of the unit, there may be provided one or more openings 22 in the transition piece 17 such that the exhaust gas stream flow is in open communication with the trapped zone 23 between inlet plate 3 and the transverse partitioning member 16. Such trapped zone provides an additional resonating section in the converter-muffler unit.

It may be noted that the outer catalyst retaining perforate member 20 is shown tapered with respect to the inner tubular perforate member 18 and with the outer shell 1 such that the downstream end portion of the catalyst section 19 is of greater thickness than the upstream end portion thereof with respect to radial gas flow through the unit. At the same time, the tapering member 20 forms a gas distributing manifold section 24 which has a lesser cross sectional area at the downstream end than at the upstream end which is in open communication with the gas collection manifold section 13 where the exhaust gas stream is received from an initial passage through bed 10.

In the operation of the unit of FIGURE 1, the exhaust gas stream from the engine is introduced into the decreasing cross sectional area provided by perforate member 8 such that there is a substantially uniform gas flow through contact bed 10 into the exterior annular zone 13 and then a resulting longitudinal flow in an annular shaped path parallel with the outer housing 1 to the distributing section 24. As a result, the hot partially oxidized gas stream is in heat exchange relationship with the outer shell 1 and will be subjected to cooling prior to its inward radial flow through the second stage contact section 19 toward the inner tubular perforate member 18 and eventually outwardly from the unit by way of transition member 17 and exhaust gas port 5.

In accordance with the preferred design and construction of a catalytic converter providing for means effecting a substantially uniform space velocity through the catalyst sections, it may again be noted that there is a greater bed thickness at the downstream end of section 10 by virtue of the tapering section 8 and a greater bed thickness to the catalyst section 19 at its downstream end by virtue of the outwardly tapering perforate member 20. The greater bed thicknesses providing greater pressure drops for the exhaust gas flow at the downstream end portions to in turn convert the velocity head effect through the unit into static pressure and force more gas flow through upstream end portions of beds 10 and 19 respectively.

Referring now particularly to FIGURE 2 of the drawing, there is indicated an oval form converter-muffler which may be of the same general shape and configuration as that shown in FIGURE 1, with an outer shell 1' and an outer perforate catalyst retaining member 11' forming an outer gas collecting zone 13'. There is also provided an inner catalyst retaining member 8' connecting with a transverse non-perforate member 9' such that gas flow passing radially outwardly from the inside of the unit passes through the catalyst retaining section 10' to the gas collection section 13'. The outer shell 1' is provided internally with a plurality of spaced longitudinal fins 25 as well as with a plurality of spaced outer fins 26 which increase the heat transfer rate from the partially treated exhaust gas stream in zone 13' to the atmosphere outside of shell 1'. In other words, there is provided an extended surface area to the outer shell 1' to increase the efficiency of heat transfer through such shell. The present longitudinal fins are indicated at a wide spacing and as extending straight radially outward; however, it is not intended to limit the present improved converter construction providing for the intermediate flow of the exhaust gas stream along an outer shell to use any one type of extended surface construction, inasmuch as there are many known forms of fin designs and corrugated wall arrangements which may be utilized to optimize heat transfer through a particular shell. For example, short closely spaced heat transfer studs, rather than fins, may be used, or alternatively, various forms of circumferential fins or tubes may be used in lieu of the longitudinal arrangement of fins.

In FIGURE 3 of the drawings, there is indicated the use of valving means in combination with a converter of the same general construction and arrangement as that indicated in FIGURE 1. A movable valve plate 27 connected to a rotatable shaft 28 is mounted adjacent an internal divider plate 9". The shaft 28 may be connected to a bimetallic strip or other temperature sensitive means, not shown, which will serve to effect a translatory movement or rotation such that plate member 27 is rotated away from a gas passageway such as opening 60 in plate 9" responsive to an excessive temperature in one or both of the catalyst retaining sections of the unit. When the valve plate 27 is open, such as in the dashed line position indicated in the drawing, the exhaust gas flow will primarily pass from inlet port 4" to the interior of tubular section 8" and thence straight through passageway 60, rather than pass radially outwardly through catalyst bed 10".

In still another modified arrangement, there may be a movable valve plate member 29 positioned adjacent an opening 30 in partitioning member 6", with such valve member attaching to a rotatable shaft member 31 which in turn may be moved manually or connect with a bimetallic member or other temperature sensitive means to effect its rotation responsive to a particular operating change. Thus, when it is desired to bypass a first stage catalyst bed 10", at least in part, there may be a direct mechanical linkage to shaft 31 to permit the opening of valve member 29 with respect to opening 30 causing the gas to flow directly from the port 4" through openings 14" into the opening 30 and gas collection section 13", for subsequent flow through a downstream catalyst section 19″ and to the outlet port of the unit. It is not intended to limit the present invention to the use of the particular form of valving means indicated in the drawing, inasmuch as it is obvious that other forms of movable members can be utilized in combination with the partitioning plates to effect optional flows through the unit. It is, however, desired to point out that the two-stage catalyst bed design provide greater flexibility in flow arrangement and conversion operations whereby the exhaust gas stream may be contacted with a quantity of catalyst maintained in first and second stage beds or, alternatively, there may be a bypassing of one bed or both beds by manual or automatic control flow means connecting to the damper means.

In still another optional arrangement, the upstream catalyst bed 10″ may be utilized as an igniter catalyst for use only when the converter-muffler is substantially cool or at the time of engine startup. In this case, the initial gas flow is through beds 10″ and 19″, but upon one or both of the catalyst beds reaching a predetermined temperature which will sustain catalyst oxidation in the downstream bed 19″ then there may be an opening of the valve member 29 such that a larger portion of the gas flow bypasses the igniter bed 10″ to be converted primarily in a downstream section 19″. Such an arrangement will tend to provide a long sustained life with low temperature ignition characteristics for the upstream bed 10″. FIGURE 3 also shows the use of an auxiliary air inlet line 59 to provide secondary air ahead of the second stage catalytic contact section 19″. Particularly when a pump means is used to supply secondary air, rather than an aspirator means, the amount of combustion in the upstream end and the amount of combustion in the downstream bed may be regulated to control temperatures by proportioning air supply to each catalyst section from the total air stream.

Referring now to FIGURE 4 of the drawing, there is indicated a special form of two-stage catalytic muffler having an outer housing comprising an upstream shell 32 and a downstream outer shell 33 and having, respectively, flanges 34 and 35 adapted to abut one another. Such flanges may be bolted or attached by clamping means to provide a rigid connection between the two sections. The upstream housing section 32 is provided with an end plate 36 and an internally projecting inlet conduit 37 which in turn has end plate 38 and opening 39 arranged to introduce the exhaust gas stream centrally into an inner manifold section 40. The latter is bounded by an internal perforate catalyst retaining member 41 and a non-perforate end plate 42. Spaced circumferentially around perforate member 41 is an outer perforate member 43 forming a catalyst retaining section 44 as well as an outer gas collection zone 45 adjacent the inside wall of outer housing section 32. Thus, in operation, the exhaust gas stream passes concentrically outwardly from ports 39 into the internal manifold section 40 and thence radially outwardly through bed 44 into the outer annular gas collecting space 45. Subsequently the gas stream flows lineally along the inside walls of housing sections 32 and 33 and in heat exchange relationship therewith to a downstream manifold section 46. The intermediate flow in an outer annular gas passageway adjacent the outer wall of the unit thus provides a design that is similar to that set forth and described in connection with FIGURES 1 and 3 of the drawing. Also, as in FIGURE 2, there may be extended surface area fins or projecting members that are utilized in connection with shell sections 32 and 33 to enhance the heat transfer and cooling of the exhaust gas stream prior to its entry into the second stage of contact.

Spaced internally from downstream section 33 is an outer catalyst retaining section 47, a catalyst section 48 and an inner perforate catalyst retaining member 49 which defines the periphery of the treated gas collection section 50 and serves to discharge the gas stream through outlet port 51. A non-perforate transverse partitioning member 52 connects with the ends of perforate members 47 and 49 to provide an end closure plate for manifold section 50 as well as for the end of the catalyst section 48. At the opposing end, an annular form radially projecting end plate member 53 is spaced from an end housing plate member 54 and serves to provide an end closure for the catalyst retaining section 48 at the downstream end of the unit. In a modified construction, the end closure plate 53 may be eliminated and the perforate member 47 attached directly to the interior of end housing plate 54; however, as described in connection with the embodiment of FIGURE 1, the spaced interior radially projecting end plate type of construction provides greater flexibility for the lineal expansions of perforate member 47 with respect to internal member 49 as well as with respect to the outer housing section 33 precluding buckling or deformation which may arise from differential expansions. With regard to lineal expansion of the two separate catalyst sections, the present embodiment provides fixity of the upstream end portion of catalyst section 44 such that the downstream end, defined by the non-perforate end plate 42, will expand and move toward the center of the unit away from end plate 36. Thus, the internal end at the partition plate 42 is left unattached to the outer shell 32 but is guided and held in a central axial position by means of spaced shoe members 55. At least three such members are spaced peripherally around the inside of shell 32 and are in sliding engagement with the downstream end of outer perforate catalyst retaining member 43. In a similar arrangement, the outer perforate catalyst retaining member 47 is fixedly attached to the end plate member 53 at one end, while the other end which is attached to the freely floating end plate member 52 is in sliding engagement with another set of shoe members 56. The latter serve to maintain the internal end of the catalyst retaining section 48 in proper axial alignment with the housing. This latter construction provides distinctly separate upstream and downstream sections to eliminate long tubular members internally within the unit and in addition provides for accommodating the longitudinal expansion from high temperature operations. In other words, there is an elimination of relatively large deflections from any one point, or differential expansions with respect to adjacent portions of the unit, which may result in buckling and opened seams or joints and permit the bypassing of the gas stream and the spillage of catalyst particles from the catalyst retaining sections. While the spaced apart upstream and downstream catalyst sections have been shown only in connection with the embodiment of FIGURE 4, it should be pointed out that the internal shoe arrangement for longitudinal sliding movement of the catalyst retaining members from the opposing ends of the housing, may well be used in connection with a one piece outer housing, such as in FIGURES 1 and 3.

There is also indicated in the present embodiment of FIGURE 4 a means for replacing catalyst from the separate catalyst retaining sections upon the disconnecting of outer section 32 from outer section 33 at the intermediate flanged joint. The end of catalyst retaining section 44 is provided with a removable fill plug 57 in the edge of end plate 42. Similarly, a removable plug 58 in end plate 52, at the end of catalyst section 48, provides for access to the downstream catalyst section. It may be further noted in the specific embodiment of FIGURE 4, that the outer downstream end housing section 33 is tapered gradually inward at the downstream end so that the gas distributing manifold section 46 decreases in its annular cross sectional area so as to increase static pressure and to enhance the uniformity of flow through the catalyst retaining section 48 to the outlet manifold 50. The upstream catalyst section 44 is maintained substantially uniform in thickness; however, the special internal distributing pipe 37, together with gas distributing openings 39 provide means for effecting a uniform gas distribution to the catalyst bed.

It may be understood that various minor modifications in the design and/or location of various portions of the apparatus may be made within the scope of the present invention. As for example, there may be variations in the shape and spacing of partitioning members from that indicated in the drawing, or in the location and design of the fill plug arrangement to the interior catalyst retaining section, as well as with respect to the sizing and positioning of various openings for the gas flow through various partitioning and stiffening members.

The perforations in the catalyst retaining shell will, of course, be sized in relation to the size of the catalyst particles which are to be maintained within the apparatus. The physical shape of the catalyst particles may be such that they are in the form of spheres, cylinders or pellets, typically having a dimension of $\frac{1}{16}$ inch to about $\frac{1}{4}$ inch, although particles of larger or smaller dimensions may be employed, where desirable. Mixed sizes of the catalyst may well be utilized. However, in loading the catalyst, care should be taken to be sure that the catalyst particles are uniformly packed in all portions of the bed to provide substantially uniform resistance to the gas flow therethrough. As indicated hereinbefore, it is not intended to limit the present invention to any one type of catalyst, but suitable oxidation catalysts include the metals of Groups I, V, VI and VIII of the Periodic Table, particularly copper, silver, vanadium, chromium, iron, cobalt, nickel and platinum. These components may be used singly, in combination with two or more, or may be composited with an inorganic refractory oxide such as alumina, silica-alumina, silica-alumina-zirconia, silica-thoria, silica-boria and the like.

I claim as my invention:

1. A two-stage catalytic converter-muffler apparatus for treating an exhaust gas stream which comprises, in combination, (a) an elongated cylindrical-form outer housing with end closure members having gas port means therethrough, (b) perforate elongated cylindrical-form catalyst retaining outer shell means spaced from the inside wall of said housing a uniform distance for at least a portion of the lineal length thereof in the upstream end zone of the housing and then tapering to an enlarged circumference at the downstream end to thereby form with the outer housing an elongated uniform annular shaped gas collection section and a downstream decreasing cross sectional area gas distributing manifold section, (c) an upstream perforate tapering cylindrical-form inner catalyst retaining member within the interior of the upstream end of said outer catalyst retaining shell means, with such inner member tapering in a downstream direction whereby to provide a decreasing cross sectional area inlet section within the interior thereof and catalyst section increasing in cross sectional area in the downstream direction between the spaced perforate shell means, (d) a downstream perforate cylindrical-form inner catalyst retaining member spaced within the downstream end portion of said outer perforate shell means and thereby providing a catalyst retaining section increasing in area in the downstream direction between said inner member and said outer shell means, (e) partitioning plate means extending transversely across the inside of said shell means and between the adjacent interior end portions of said inner perforate catalyst retaining members whereby to separate an upstream catalyst retaining section from a downstream catalyst retaining section, with the last-named sections being coextensive with respectively said upstream inner catalyst retaining member and with said downstream catalyst retaining member, said retaining sections having imperforate end closures and each containing a bed of oxidation catalyst, (f) an inlet gas passageway means connecting between the interior of said upstream perforate catalyst retaining section and the adjacent gas port means in the end of said housing and outlet gas passageway means connecting between the interior of said downstream perforate catalyst retaining member and the adjacent port means in the end of said housing, whereby the gas stream through said apparatus passes initially radially outwardly to the gas collecting section, longitudinally to the gas distributing manifold section adjacent the outer housing, then radially inwardly to the interior of said downstream inner catalyst retaining member and thence outwardly through the gas port means connecting therewith.

2. The converter-muffler apparatus of claim 1 further characterized in that said outer housing is provided with extended area surface means providing an increase in the heat transfer ability of such outer housing between the adjacent inner annular space and the outside of said housing.

3. The apparatus of claim 1 further characterized in that a transverse partitioning plate is spaced from the end closure member of said outer housing at the inlet end thereof, and said inner and outer perforate catalyst retaining members extend longitudinally downstream therefrom, gas passageway means is provided within said transverse partitioning plate between the space from the latter to the end closure plate of the housing and the outer annular gas collecting section around said upstream outer perforate catalyst retaining member, an opening is provided in said inlet gas passageway means and adjustable movable valve plate means is positioned adjacent to and in cooperation with said gas passageway means in said transverse partitioning plate whereby an exhaust gas stream may be passed directly into such annular gas collecting section to bypass radial flow outwardly from said upstream inner catalyst retaining member.

References Cited by the Examiner

UNITED STATES PATENTS

| | | | |
|---|---|---|---|
| 2,071,119 | 2/37 | Harger. | |
| 2,131,001 | 9/38 | Prochnow | 181—59 |
| 2,488,563 | 11/49 | Sills. | |
| 2,635,989 | 4/53 | Bonner | 23—288 X |
| 2,639,224 | 5/53 | McAfee | 23—288 |
| 2,674,521 | 4/54 | Houdry. | |
| 2,747,976 | 5/56 | Houdry | 23—288.3 |
| 2,772,147 | 11/56 | Bowen et al. | 23—288.3 |
| 2,776,875 | 1/57 | Houdry | 23—288.3 |
| 2,777,759 | 1/57 | Sokolik. | |
| 2,807,930 | 10/57 | Bratton. | |
| 2,898,202 | 8/59 | Houdry et al. | 23—288.3 |
| 2,991,160 | 7/61 | Claussen | 23—288.3 |
| 3,050,935 | 8/62 | Eastwood. | |
| 3,083,084 | 3/63 | Raymond | 23—288.3 |
| 3,086,839 | 4/63 | Bloch | 23—288.3 |
| 3,090,677 | 5/63 | Scheitlin et al. | 23—288.3 |
| 3,094,394 | 6/63 | Innes et al. | 23—288.3 |
| 3,097,074 | 7/63 | Johnson | 23—288.3 |

FOREIGN PATENTS 448,850   6/36   Great Britain.

MORRIS O. WOLK, *Primary Examiner.*